Patented June 30, 1925.

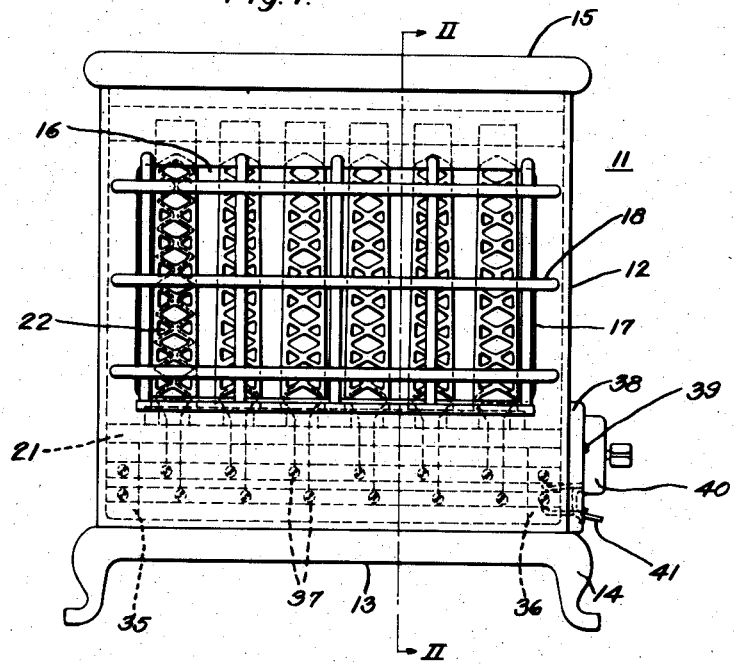

1,543,721

UNITED STATES PATENT OFFICE.

JOSEPH H. PROCTER, OF WILKINSBURG, PENNSYLVANIA, ASSIGNOR TO WESTINGHOUSE ELECTRIC & MANUFACTURING COMPANY, A CORPORATION OF PENNSYLVANIA.

RADIANT HEATING UNIT.

Application filed June 30, 1923. Serial No. 648,709.

*To all whom it may concern:*

Be it known that I, JOSEPH H. PROCTER, a citizen of the United States, and a resident of Wilkinsburg, in the county of Allegheny and State of Pennsylvania, have invented a new and useful Improvement in Radiant Heating Units, of which the following is a specification.

My invention relates to electrically heated devices and particularly to electric air heaters of the radiant type.

One object of my invention is to provide a relatively simple and compact electric air heater comprising a plurality of luminously radiant refractory skeleton frames.

Another object of my invention is to provide an electric air heater comprising a plurality of embedded electric heating elements.

In practicing my invention, I provide a suitable casing having a front opening therein. A plurality of relatively light skeleton frames of refractory electric-insulating material are located in said casing back of said front opening and are severally provided with an embedded electric heating member mounted therein. A reflector plate of refractory material is located in said casing back of said radiant heating units. A control switch is provided to permit of controlling the energization of the heating units.

In the single sheet of drawings,

Figure 1 is a view, in front elevation, of an electric air heater embodying my invention, Fig. 2 is a view in vertical lateral section therethrough, taken on the line II—II of Fig. 1, Fig. 3 is a view, in front elevation, of a skeleton frame comprising the device embodying my invention, Fig. 4 is a view, in vertical longitudinal section therethrough, taken on the line IV—IV of Fig. 3, and Fig. 5 is a view, in lateral section, through a part of the skeleton frame illustrated in Fig. 3, taken on the line V—V thereof.

An electric heater 11 comprises a suitable casing 12 located on a base 13 having a plurality of supporting members 14. A cover member 15 is provided for the casing 12 and it may be made removable therefrom to permit of mounting the other parts of the heater, to be hereinafter described, in the casing 12. The casing and the base and top members may be built up either by the use of punched sheet metal members or by the use of castings and may be of any suitable design and contour to provide a heater of a pleasing and ornamental appearance.

The casing 12 is provided with a depressed front portion 16 having an opening 17 therein. A protecting grating 18 comprising a plurality of vertically and of horizontally extending rods is removably mounted in the casing 12 in the depressed portion 16 thereof.

A reflector plate 19 of a suitable refractory material is located within the casing 12 back of the front opening 17 and may be supported on a refractory plate 21 that extends laterally of the casing 12 below the front opening.

A plurality of skeleton frames 22, of refractory electric-insulating material, are located in the casing 12 in front of the plate 19 and may be located on and supported by the plate 21, each of the members 22 having a suitable base portion 23 fitting into suitable openings 24 in the member 21 to properly locate them in adjacent spaced relation relatively to each other. The upper ends of the members 22 may comprise a flattened extension 25 that operatively engages the rear surface of a refractory member 26 that is located in the upper portion of the casing 12. The member 26 extends laterally with respect to the member 22 and is so located that the extensions 25 are held between the upper edge of the plate 19 and the rear surface of the member 26.

The skeleton frames 22 may comprise a relatively thin rear wall 27, side flanges 28, and a plurality of bridges 29 that extend angularly from one flange 28 to the other, substantially as illustrated in Fig. 3 of the drawing.

A heating element 31 is located in the bridges 29 which are provided with connecting grooves 32 to permit of the wire 31 being placed therein and held therein by a filling 33 of a suitable refractory material. By providing the groove 32 in each of the bridges 29, it is possible to employ a heating element having a length much greater than that of the elongated member 22, thereby making it possible to employ a wire of a relatively large area of cross-section.

A plurality of bus bars 34 may be suitably mounted in the lower part of the casing 12, as by being secured to blocks 35 and 36, of refractory electric-insulating material. The ends of the resistor members 31 may be connected to the respective bus bars 34 by screws 37. A face plate 38 of a suitable refractory material may be secured against one side of the casing 12, as by screws 39, and have mounted thereon a suitable control switch 40. Contact terminal pins 41 may also be mounted on the plate 38 and be connected to the bus bars and to the control switch 40 by suitable means to permit of controlling the energization of the heating units.

By making the skeleton frames 22 and particularly the integral bridges 29 thereof of relatively small area of cross-section, it is possible to cause these members to glow when the resistor members 31 are traversed by a suitable electric current. By providing a skeleton frame having a front portion of ornamental and pleasing appearance, with a resistor member imbedded therein, heating units of pleasing and ornamental appearance may be provided.

While I have illustrated a specific embodiment of a skeleton frame, I do not desire to be limited thereby and while the heating element has been illustrated as comprising a wire, it is, of course, understood that a helically wound resistor member may be employed whereby it is possible to concentrate a relatively large amount of eletric energy in a skeleton frame and a greater luminosity thereof may be obtained.

Various modifications and changes may be made without departing from the spirit and scope of my invention, and such modifications are intended to be covered by the appended claims.

I claim as my invention:

1. An electric air heater comprising an elongated skeleton frame of refractory electric-insulating material and a resistor embedded therein, the length of the resistor being greater than the length of the frame.

2. An electric air heater comprising a frame of refractory electric-insulating material having a plurality of integral members of relatively small area of cross-section, and a resistor member embedded in said integral members.

3. An electric air heater comprising a frame of refractory electric-insulating material having a plurality of integral members of relatively small area of cross-section, and a resistor member embedded in said integral members and adapted to be traversed by a current of such value as to cause said integral members to become substantially radiant.

4. An electric air heater comprising a casing, a reflector plate of refractory material in said casing, a skeleton frame of refractory electric-insulating material in front of said reflector, and a resistor embedded in said frame.

5. An electric air heater comprising a casing, a reflector plate of refractory material in said casing, a plurality of skeleton frames of refractory electric-insulating material located in parallel-spaced relation relatively to each other in front of said reflector plate and resistor members embedded in said skeleton frames.

In testimony whereof, I have hereunto subscribed my name this 27th day of June, 1923.

JOSEPH H. PROCTER.